US012530883B2

(12) United States Patent
Fehr et al.

(10) Patent No.: US 12,530,883 B2
(45) Date of Patent: Jan. 20, 2026

(54) METHOD AND SYSTEM FOR TIRE TREAD PATTERN IMAGE SEGMENTATION

(71) Applicants: The Goodyear Tire & Rubber Company, Akron, OH (US); LUXEMBOURG INSTITUTE OF SCIENCE AND TECHNOLOGY, Esch-sur-Alzette (LU)

(72) Inventors: Duc Alexandre Fehr, Bascharage (LU); Frank Petry, Bertrange (LU); Uriel Rodrigo Nava Velazco, Esch-sur-Alzette (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 397 days.

(21) Appl. No.: 18/328,837

(22) Filed: Jun. 5, 2023

(65) Prior Publication Data
US 2024/0404264 A1 Dec. 5, 2024

(51) Int. Cl.
*G06V 10/82* (2022.01)
*G06T 5/60* (2024.01)

(52) U.S. Cl.
CPC .............. *G06V 10/82* (2022.01); *G06T 5/60* (2024.01); *G06T 2207/10048* (2013.01); *G06T 2207/20024* (2013.01); *G06T 2207/20192* (2013.01)

(58) Field of Classification Search
CPC .............. G06V 10/82; G06T 5/60; G06T 2207/10048; G06T 2207/20024; G06T 2207/20192; G06T 2207/2008; G06T 2207/20084; G06T 5/73
See application file for complete search history.

(56) References Cited

U.S. PATENT DOCUMENTS

2022/0339969 A1\* 10/2022 Hosu ................... G06V 10/764
2023/0281976 A1\* 9/2023 Chateau ................... G06T 7/70
382/141

\* cited by examiner

*Primary Examiner* — Stephen R Koziol
*Assistant Examiner* — Michael Kim Maiden
(74) *Attorney, Agent, or Firm* — Eryn Ace Fuhrer; Mandy B. Willis

(57) ABSTRACT

The invention provides a computer-implemented method and a system for automatically segmenting thermal images of a tire's footprint in order to identify components of the tire's tread pattern. The invention relies on a convolutional neural network model and on digital image pre-filtering. It is capable of accurately segmenting thermal footprint images of tires in either straight rolling or cornering conditions, which allows for the accurate extraction of temperature data for each identified tread pattern component.

20 Claims, 8 Drawing Sheets

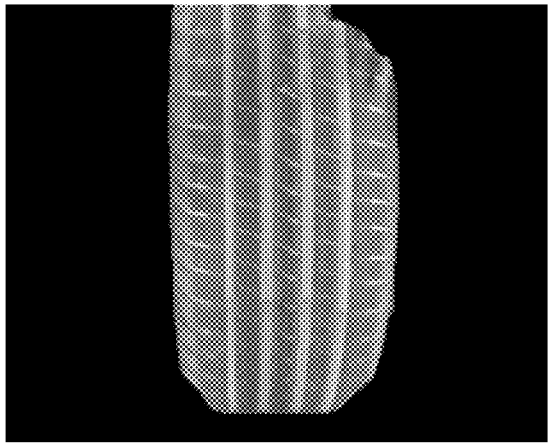 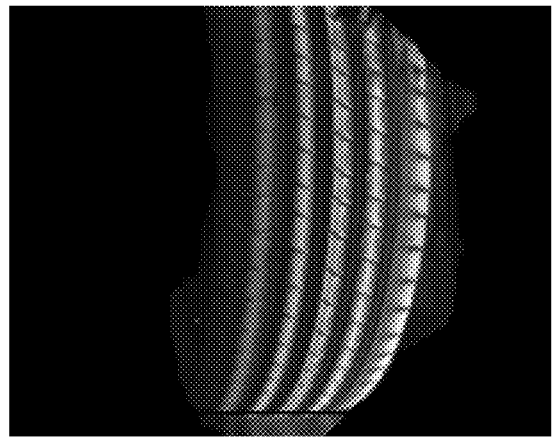
Fig. 1A　　　　　　　　　　Fig. 1B
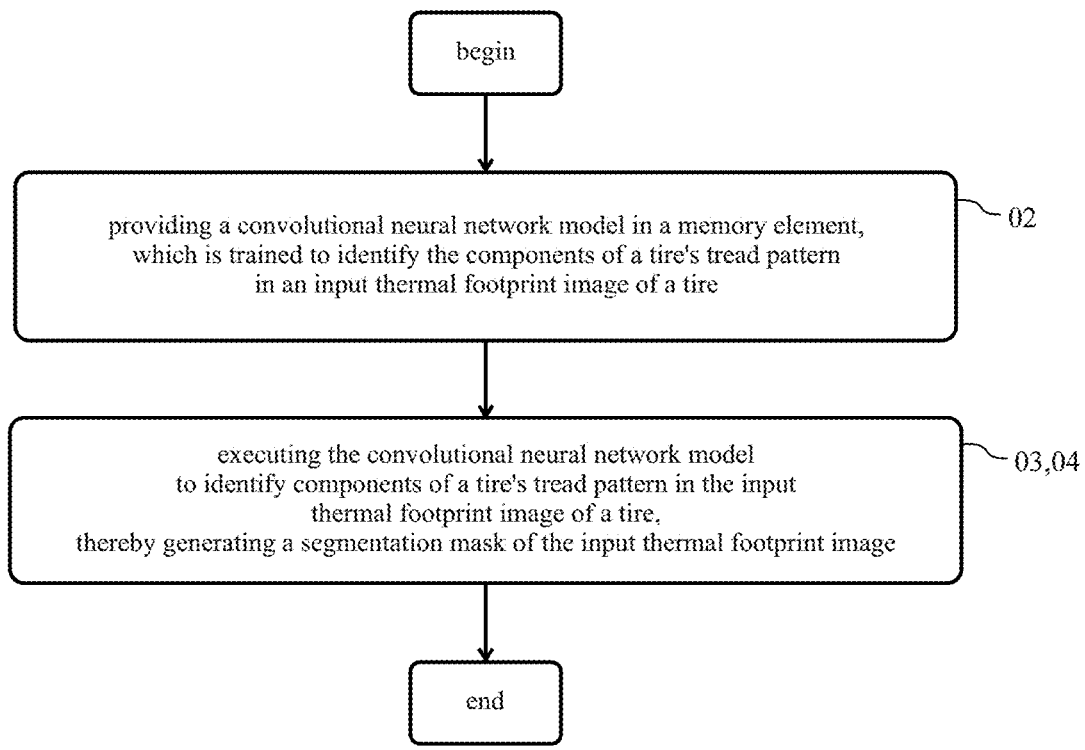
Fig. 2

METHOD AND SYSTEM FOR TIRE TREAD PATTERN IMAGE SEGMENTATION

FIELD OF THE INVENTION

The invention relates generally to tire component temperature measurement methods. More particularly, the invention is directed to a computer-implemented method and a system for identifying components of tire tread patterns in thermal footprint images thereof.

BACKGROUND OF THE INVENTION

Tire tread design is a critical task to ensure optimal tire performance in terms of stability, grip, and fuel consumption. The tire's tread is the part of the rubber tire that establishes contact with the surface of the road when a vehicle is driving. Taken together, the ribs, grooves and tread blocks are typically arranged in a unique tread pattern, which impacts the tire's performance with respect to generated noise, handling of the vehicle, traction, and tire wear.

Understanding what physically happens to a tire's tread pattern when a vehicle is driving on a road surface is inherently difficult. The tire interacts with the road on a small surface patch, called footprint, at any given moment, and this patch of the tire's tread is difficult to access for measurements while driving. However, such an understanding, including understanding how the temperature of the rubber evolves in different parts of the tread pattern as it interacts with the supporting surface, is key for providing improved tread design or rubber compositions, which in turn lead to improved traction and handling of the tire and to improved vehicle safety.

Under lab conditions, a tire may be mounted on a rotating axle while it interacts and rolls on a transparent surface, beneath which a thermal imaging device is mounted so that the contact surface between the tire's tread pattern and the transparent surface is within the imaging device's field of view. High-resolution thermal infrared, IR, imaging is a non-contact technology that converts the radiation pattern of an object within the range of [3 μm-14 μm] into a visible image in the range of [400 nm-700 nm], which is proportional to the emitted infrared energy. The visual image provides an accurate reading of the temperature of the imaged scene. A digital image captured using a thermal IR imaging device essentially provides an array matrix of pixels, wherein each pixel value is indicative of a temperature value. It is difficult to attribute any of these pixel values to specific components of the imaged tire's tread pattern, i.e., to attribute a pixel value to either of a rib, shoulder, groove or even to the imaged background. However, such an attribution is necessary for understanding, the thermal evolution of the components while the tire is being driven.

It is an objective of the invention to provide a method that alleviates at least some of the disadvantages that are present in the prior art.

SUMMARY OF THE INVENTION

In accordance with a first aspect of the invention, a computer-implemented method for identifying components of a tire's tread pattern in an input thermal footprint image of a tire is provided. An input thermal footprint image of a tire is acquired from underneath a transparent surface while the tire is rolling thereon. The method comprises the steps of providing a convolutional neural network model in a memory element, which is trained to identify the components of a tire's tread pattern in an input thermal footprint image of a tire; executing the convolutional neural network model to identify components of a tire's tread pattern in the input thermal footprint image of a tire, thereby generating a segmentation mask of the input thermal footprint image; wherein executing the convolutional neural network model comprises the steps of associating a resolution value with each of a plurality of consecutive processing stages forming the convolutional neural network model, each processing stage comprising an encoder block and an associated decoder block; processing, at an encoder block of at least one processing stage, an encoder input having the resolution value associated with the processing stage, into an output having the same resolution value, which is forwarded to an associated decoder block, and which is down-sampled to a lower resolution value for processing by a processing stage associated with the lower resolution value; processing, at a decoder block of said at least one processing stage, a decoder input comprising a concatenation of the output forwarded by an associated encoder block and of an up-sampled output generated by a processing stage associated with a lower resolution value, into a processing stage output having the resolution value associated with the decoder block's processing stage.

Processing at the encoder block and at the decoder block comprises processing the respective input into a plurality of filtered intermediate outputs by using an atrous convolution step, wherein a filtering kernel is used at a corresponding plurality of different kernel dilution rates, and computing the respective output by generating an average of the filtered intermediate outputs.

The transparent surface may preferably comprise a surface that is transparent to infrared radiation.

Preferably, the step of providing a convolutional neural network model may comprise the preliminary steps of providing a plurality of thermal footprint training images of at least one tire, in which known components of the respective tire's tread pattern are identified; executing the convolutional neural network model using each of the thermal footprint training images as an input thermal footprint image, to identify components of a tire's tread pattern in the thermal footprint training images, thereby generating a segmentation mask of the corresponding thermal footprint training images, and iteratively updating trainable parameters of the convolutional neural network model so as to minimize an error between the components of a tire's tread pattern that are identified by the convolutional neural network model, and the known components of the tire's tread pattern, which are identified in the corresponding thermal footprint training image of the tire; thereby training the convolutional neural network model.

The input thermal footprint image of a tire may preferably be pre-processed using an edge enhancing digital image filter prior to executing the convolutional neural network model to identify components of a tire's tread pattern in the pre-processed input thermal footprint image.

It may further be preferred that the input thermal footprint image of a tire is pre-processed using a filter bank comprising a plurality of Gabor filters, wherein each Gabor filter is characterized by a different combination of orientation and scale.

Preferably, a first processing stage of the convolutional neural network model may comprise a pre-filtering stage that includes an edge enhancing digital image filter and a digital image filter having trainable parameters, for pre-filtering the input thermal footprint image of a tire, and wherein the trainable parameters of the digital image filter are determined during a training step.

The edge enhancing digital image filter may preferably comprise a filter bank of Gabor filters, wherein each Gabor filter is characterized by a different combination of orientation and scale, and wherein the digital image filter having trainable parameters comprises a filter bank of digital image filters having trainable parameters. Preferably, the input thermal footprint image of a tire may be filtered in parallel by the filter bank of Gabor filters and by the filter bank of digital image filters having trainable parameters, wherein the two respective filtered outputs are concatenated for processing by the processing stages of the convolutional neural network model.

Preferably, processing the respective input at the encoder block and at the decoder block of a processing stage of the convolutional neural network model into a plurality of filtered intermediate outputs by using an atrous convolution step may comprise processing the respective input into three filtered intermediate outputs using an atrous convolution step, wherein a same filtering kernel of size 7 times 7 pixels is used at the three kernel dilution rates of 1, 2 and 4.

It may further be preferred that the convolutional neural network model comprises three processing stages.

The generated segmentation mask may preferably be a multi-class segmentation mask comprising at least three different classes.

Preferably, a first processing stage, which comprises the final layer of the convolutional neural network model, may comprise a final activation function of the SoftMax type, for classifying the output of the decoder block of the first processing stage into a plurality of at least three different classes, thereby identifying a corresponding plurality of component types of a tire's tread pattern.

The trained convolutional neural network model may preferably be capable of identifying at least background, ribs and groves of a tire's tread pattern in an input thermal footprint image of the corresponding tire.

It may be preferred that the input thermal footprint image of a tire is acquired using an infrared imaging device.

Preferably, the input thermal footprint image of a tire may be pre-segmented into two classes, wherein a first class comprises the tire's footprint, and wherein a second class comprises background content.

The computer-implemented method may further preferably comprise a step of extracting temperature information of a component of a tire's tread pattern from an input thermal footprint image of the tire, based on the generated segmentation mask, which identifies the location of said component in the input thermal footprint image of the tire.

In accordance with another aspect of the invention, a computer-implemented method for identifying components of a tire's tread pattern in an input thermal footprint video of a tire comprising a sequence of input thermal footprint images of a tire acquired from underneath a transparent surface while the tire is rolling thereon is provided. The method comprises the steps of providing a convolutional neural network model in a memory element, which is trained to identify the components of a tire's tread pattern in an input thermal footprint image of a tire; executing the convolutional neural network model to identify components of a tire's tread pattern in each input thermal footprint image of the input thermal footprint video of a tire, thereby generating a segmentation mask for each input thermal footprint image; wherein executing the convolutional neural network model comprises the steps of associating a resolution value with each of a plurality of consecutive processing stages forming the convolutional neural network model, each processing stage comprising an encoder block and an associated decoder block; processing, at an encoder block of at least one processing stage, an encoder input having the resolution value associated with the processing stage, into an output having the same resolution value, which is forwarded to an associated decoder block, and which is down-sampled to a lower resolution value for processing by a processing stage associated with the lower resolution value; processing, at a decoder block of said at least one processing stage, a decoder input comprising a concatenation of the output forwarded by an associated encoder block and of an up-sampled output generated by a processing stage associated with a lower resolution value, into a processing stage output having the resolution value associated with the decoder block's processing stage; and wherein processing at the encoder block and at the decoder block comprises processing the respective input into a plurality of filtered intermediate outputs by using an atrous convolution step, wherein a filtering kernel is used at a corresponding plurality of different kernel dilution rates, and computing the respective output by generating an average of the filtered intermediate outputs.

Preferably, each input thermal footprint image of a tire may be pre-processed using a filter bank of Gabor filters and using a filter bank of digital image filters having trainable parameters, wherein each Gabor filter is characterized by a different combination of orientation and scale.

Processing the respective input at the encoder block and at the decoder block of a processing stage of the convolutional neural network model into a plurality of filtered intermediate outputs by using an atrous convolution step may preferably comprise processing the respective input into three filtered intermediate outputs using an atrous convolution step, wherein a same filtering kernel of size 7 times 7 pixels is used at the three kernel dilution rates of 1, 2 and 4.

According to yet another aspect of the invention, a system for identifying components of a tire's tread pattern in an input thermal footprint image of a tire acquired from underneath a transparent surface while the tire is rolling thereon is provided. The system comprises a memory element holding a convolutional neural network model, which is trained to identify the components of a tire's tread pattern in an input thermal footprint image of a tire; a data processor configured to execute the convolutional neural network model to identify components of a tire's tread pattern in the input thermal footprint image of a tire, thereby generating a segmentation mask of the input thermal footprint image.

Executing the convolutional neural network model comprises the steps of associating a resolution value with each of a plurality of consecutive processing stages forming the convolutional neural network model, each processing stage comprising an encoder block and an associated decoder block; processing, at an encoder block of at least one processing stage, an encoder input having the resolution value associated with the processing stage, into an output having the same resolution value, which is forwarded to an associated decoder block, and which is down-sampled to a lower resolution value for processing by a processing stage associated with the lower resolution value; processing, at a decoder block of said at least one processing stage, a decoder input comprising a concatenation of the output forwarded by an associated encoder block and of an up-sampled output generated by a processing stage associated with a lower resolution value, into a processing stage output having the resolution value associated with the decoder block's processing stage.

Processing at the encoder block and at the decoder block comprises processing the respective input into a plurality of filtered intermediate outputs by using an atrous convolution step, wherein a filtering kernel is used at a corresponding plurality of different kernel dilution rates, and computing the respective output by generating an average of the filtered intermediate outputs.

Preferably, the data processor may further be configured to pre-process each input thermal footprint image of a tire using a filter bank of Gabor filters and using a filter bank of digital image filters having trainable parameters, wherein each Gabor filter is characterized by a different combination of orientation and scale.

Processing the respective input at the encoder block and at the decoder block of a processing stage of the convolutional neural network model into a plurality of filtered intermediate outputs by using an atrous convolution step may preferably comprise processing the respective input into three filtered intermediate outputs using an atrous convolution step, wherein a same filtering kernel of size 7 times 7 pixels is used at the three kernel dilution rates of 1, 2 and 4.

In accordance with another aspect of the invention, a computer program comprising computer readable code means is provided, which, when run on a computer, causes the computer to carry out the method in accordance with aspects of the invention.

According to a final aspect of the invention, a computer program product is provided, comprising a computer-readable medium on which the computer program according an aspect of the invention is stored.

The claimed computer-implemented method allows for providing a segmentation of an input thermal IR image of a rolling tire. The generated segmentation mask identifies components of the imaged tire's tread pattern such as ribs or grooves, and therefore allows to attribute a pixel value in the input thermal IR image to a specific component of the tire's tread pattern. The proposed convolutional neural network model efficiently extracts the required image features while exhibiting reasonable computational complexity. The information that is obtained using the proposed method provides insight into the thermal evolution of components of the tire's tread pattern under real driving conditions, which in turn allows for the design of improved tread patterns.

Embodiments of the invention which use directional edge-enhancing imaging filters provide accurate segmentation of the imaged tread pattern components when the tire is rolling straight and during cornering maneuvers.

BRIEF DESCRIPTION OF DRAWINGS

The invention will be described by way of example and with reference to the accompanying drawings in which:

FIG. 1A is a thermal footprint image of a straight rolling tire;

FIG. 1B is a thermal footprint image of a cornering tire;

FIG. 2 is a workflow diagram showing the main steps of a method in accordance with a preferred embodiment of the invention;

DEFINITIONS

Figure 3:
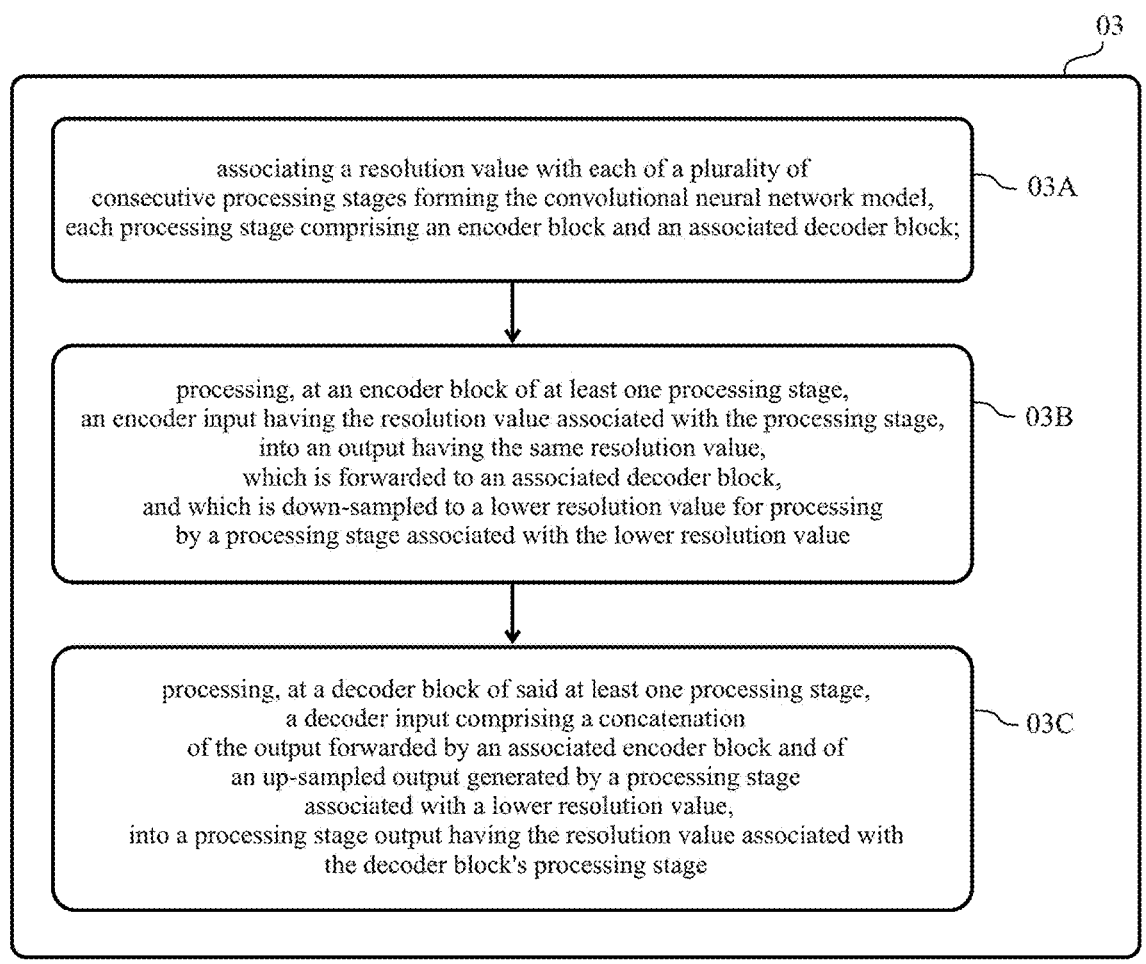
FIG. 3 is a workflow diagram showing details of step 03 as shown in FIG. 2, of a method in accordance with a preferred embodiment of the invention.

"Axial" and "axially" means lines or directions that are parallel to the axis of rotation of the tire.

"Footprint" means the contact patch or area of contact created by the tire tread with a flat surface as the tire rotates or rolls.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Convolutional neural network model" means a class of artificial neural network most commonly applied to analyze visual imagery. Convolutional neural network models use a mathematical operation called convolution in place of general matrix multiplication in at least one of their layers. They are specifically designed to process pixel data and are used in image recognition and processing.

"Atrous convolution" or dilated convolution means convolution with a dilated convolution kernel, which is obtained without increasing the number of weights by inserting zero-values into a baseline convolution kernel.

DETAILED DESCRIPTION OF THE INVENTION

FIG. 1A shows a thermal footprint image of a straight rolling tire, acquired from underneath a surface that is transparent to infrared radiation, while the tire is rolling thereon. Different shades of grey indicate different temperatures, while the background is shown in black. While a human can identify ribs and grooves of the depicted tread pattern as straight lines, automatic identification of these pattern components is not a trivial task. In the case of cornering tires shown in FIG. 1B, the task is even more complicated, as the geometry of the footprint is skewed due to lateral forces acting on the tire, and due to inhomogeneous temperatures, i.e., heterogeneous shades of grey, within an imaged rib. The tire is deformed during cornering maneuvers where a significant percentage of the tire surface slips at a high angle and therefore the friction at the footprint causes the tire to deform in vertical and lateral directions. Furthermore, temperature variations occur during maneuvers, so that during a cornering maneuver, subsequently acquired thermal images show different temperature distributions on the tire's tread pattern. The depicted images are obtained using a so-called Flat-Trac™ setup, in which a tire rolling on a road can be simulated. The tire is mounted on a fixedly mounted rotating axle while a band contacting the tire continuously moves at the same speed as the rotating tire. The band is transparent to infrared radiation so that an infrared imaging device set up beneath its surface is able to capture the tire's footprint as it evolves on the band, either driving straight at constant speed, braking or cornering. The imaging device is capable of capturing sequences of thermal images and it is supposed that the tire's footprint is located at the center of the image during a full acquisition of a video sequence.

Figure 4:
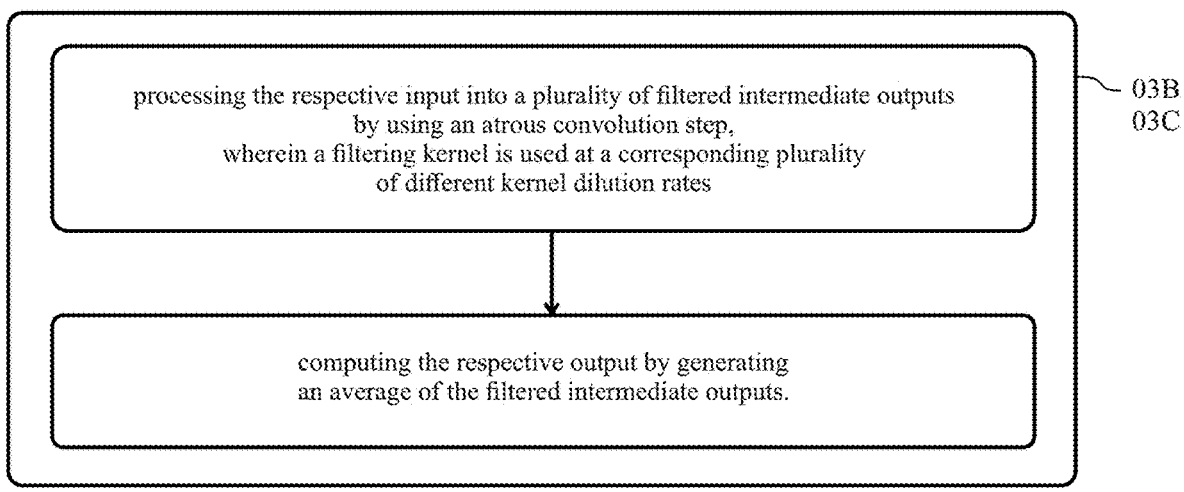
FIG. 4 is a workflow diagram showing details of steps 03B and 03C as shown in FIG. 3, of a method in accordance with a preferred embodiment of the invention.
Figure 5:
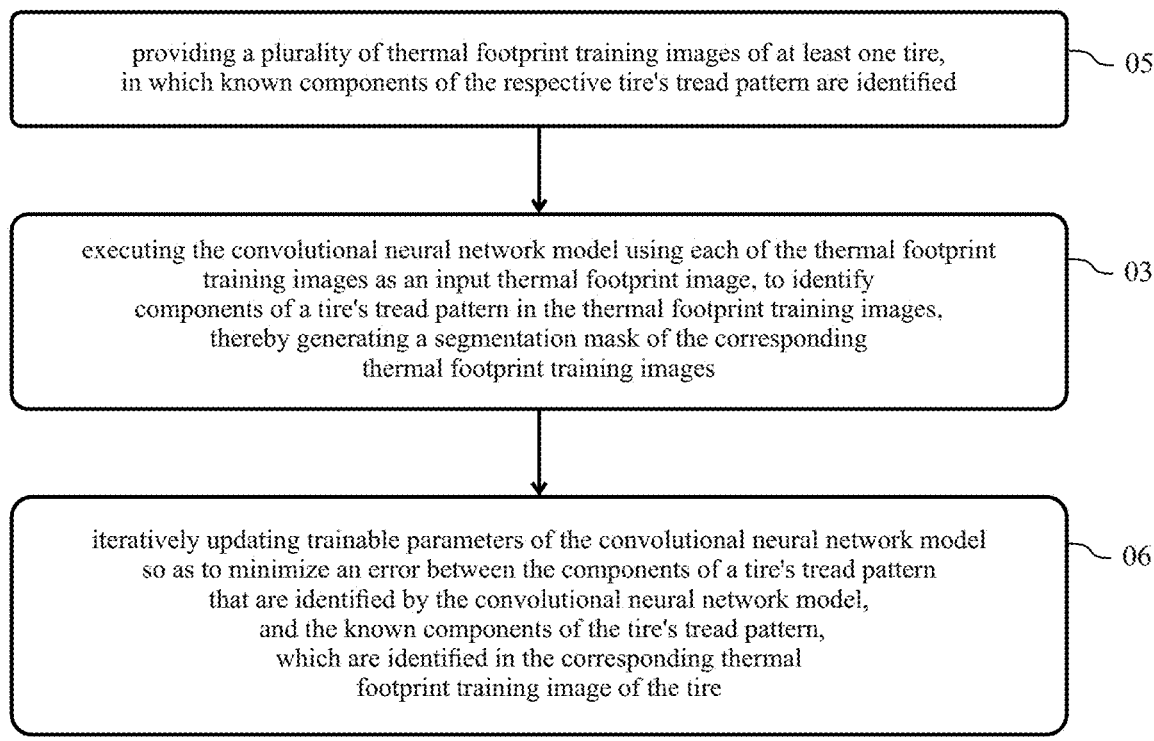
FIG. 5 is a workflow diagram showing optional steps of a method in accordance with a preferred embodiment of the invention.
Figure 6:
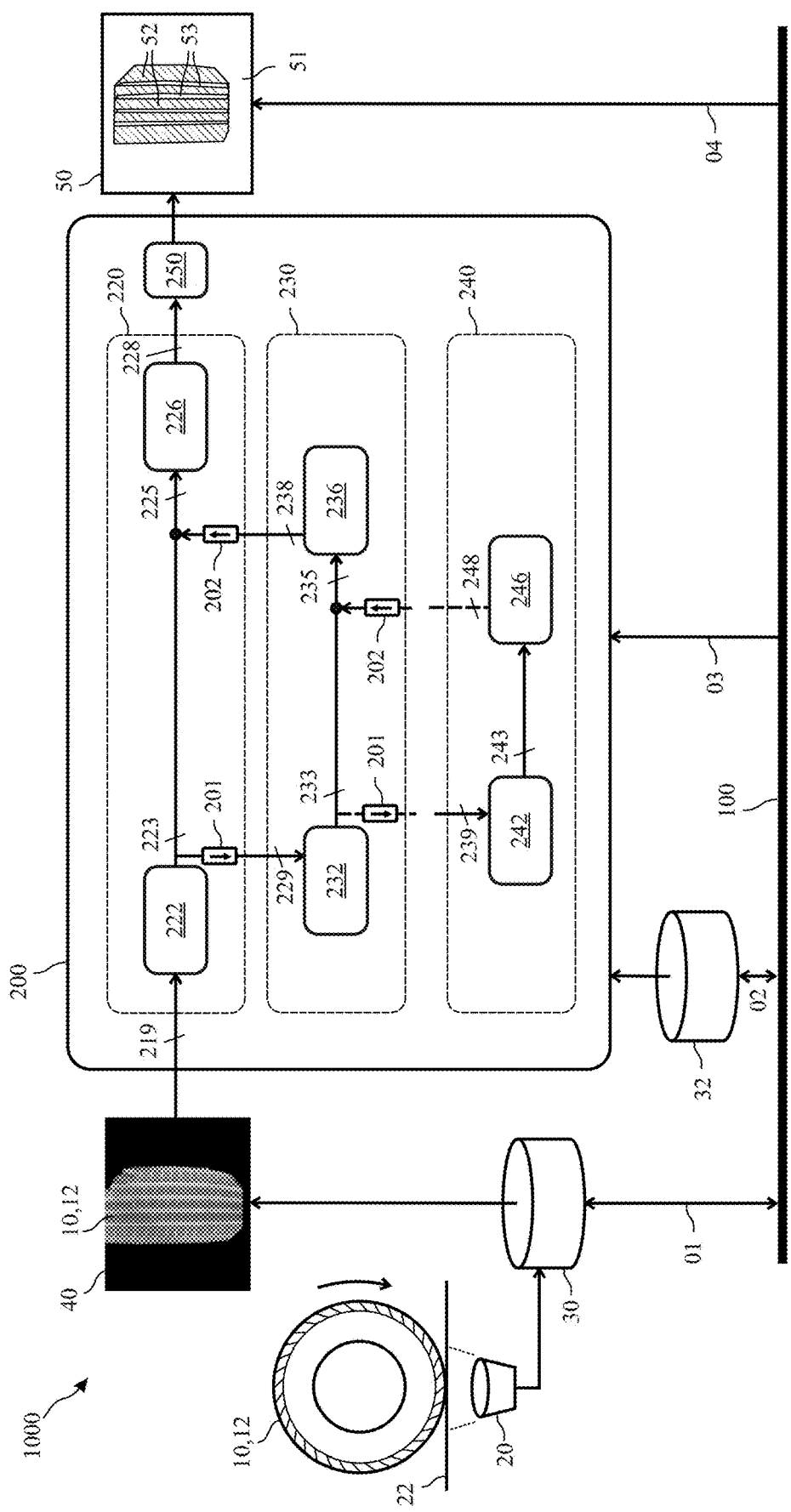
FIG. 6 is a schematic illustration of a preferred embodiment of a system in accordance with the invention.

Figures FIG. 2, FIG. 3 and FIG. 4 illustrate the main steps of claim 1, which will be explained further based on the setup and illustrations depicted in FIG. 6 and FIG. 7.

A system 1000 for identifying components of a tire's tread pattern in an input thermal footprint image is illustrated. A tire 10 having a tread pattern 12 that comprises a series of ribs, shoulders, blocks and grooves evolves on a surface 22 while an imaging device 20 such as the FLIR™ thermal infrared camera X8400sc from InfraTec mounted beneath the surface 22 captures at least one thermal footprint image 40 of the tire. Each pixel value of the image 40 is indicative of a corresponding temperature value of the depicted tread pattern 12 of the tire 10. The thermal footprint image 40 is stored in a memory element, such as a Solid-State Drive, SSD, a random-access memory, RAM, element, or any equivalent memory element known in the art. At step 01, a computer processor 100 configured through appropriately formulated computer code instructions, reads the thermal footprint image 40 from the memory element into a working memory, in order to feed it as input into the convolutional neural network model 200, which is pre-provided 02 in memory element 32, which may be distinct from or the same as memory element 30. At step 03, the computer processor executes the convolutional neural network model, which is pre-trained for this purpose, in order to identify the components of the depicted tread pattern 12 of the tire 10 in the input thermal footprint image 40. Thereby, the computer processor generates 04 a segmentation mask 50 of the input thermal footprint image 40, in which for example background pixels 51, ribs 52 and grooves 53 of the tread pattern 12 are identified and located. The segmentation mask 50 localizes the different components within the image, so that a pixel value in the input footprint image 40 can now be attributed to either the background 51, ribs 52 or grooves 53 of the tread pattern 12.

The architecture of the convolutional neural network model 200 is loosely based on the U-net architecture proposed by Ronneberger et al. in "U-net: Convolutional networks for biomedical image segmentation," 750 in Medical Image Computing and Computer-Assisted Intervention (MICCAI), vol. 9351, 2015, pp. 234-241. Some of the earliest models for semantic segmentation are based on neural networks that were originally designed for image classification. The idea is generally to take advantage of dense predictions to infer pixel-wise labels. This approach, however, generally produces very large neural networks and requires thousands of training images. The invention provides a more compact architecture for semantic segmentation that requires only few training parameters, such as the encoder-decoder architecture with skip-connections used in U-Net, that has been successfully used in medical imaging.

The convolutional neural network model 200 comprises a number of consecutive processing stages 220, 230, 240. Each layer is implemented by a set of neurons or nodes which each perform basic processing operations. While three such processing stages are shown in FIG. 6, a different plurality of processing stages may also be used without departing from the scope of the present invention. Each processing stage 220, 230, 240 comprises an encoder block 222, 232, 242 and a corresponding decoder block 226, 236, 246. The encoder blocks capture information from their respective inputs 219, 229, 239 at different image resolution levels. The decoder blocks, on the other hand, recover the resolution of the image by using a deconvolution operation. Each processing stage is associated with an image resolution value, which corresponds to the image resolution of the input image that is processed by the encoder. Consecutive processing stages are associated with consecutively lower image resolution values.

By way of example, the first processing stage 220 of the convolutional neural network model 200 comprises an encoder block 222 that processes the input 219, which is provided as the input thermal footprint image 40, into an output 223 that has the same image resolution. This output 223 is forward as an input component to the decoder block 226 block of the first processing stage 220, thereby implementing a skip connection in the convolutional neural network model. The output 223 of the encoder block 222 is further also down-sampled 201, to a lower image resolution 229 for processing by the second processing stage 230 of the convolutional neural network model 200. The down-sampling block 201 is preferably implemented by a so-called max-pooling operation, in which each non-overlapping sub-matrix or pool of 2×2 pixels in the full image is replaced in the down-sampled image by a single pixel having the maximum value among the four pixels in the pool. As such, the image resolution from one processing stage to the next is halved.

The first processing stage 220 of the neural network model 200 further comprises a decoder block 226 that process an input, which comprises a concatenation of the output 223 forwarded by the encoder block 222 of the first processing stage 200, and of an up-sampled output generated by the processing stage 230 that is associated with a lower resolution value, into a processing stage output 228, which has the resolution of the processing stage's input 219. The up-sampling block is preferably implemented by a de-convolution operation.

The consecutive processing stage 230 operates in exactly the same way, wherein the encoder block 232 processes the input image 229 into an output 233 that is forwarded to the decoder block 236 of the processing stage 230. The same output 233 is down-sampled 201 to be further processed by the next processing stage 240. The decoder block 236 of the processing stage 230 processes an input 235 which results from the concatenation of the encoder block's output 233 and an up-sampled version of the output generated by a processing stage further down, and produces a processing stage output 238 that has the same image resolution as the stage's input 229. It is this output 238 that is up-sampled and provided as an input component to the decoder block 226 of the first processing stage 220. In the last processing stage, the down- and up-sampling blocks are omitted.

Figure 7:
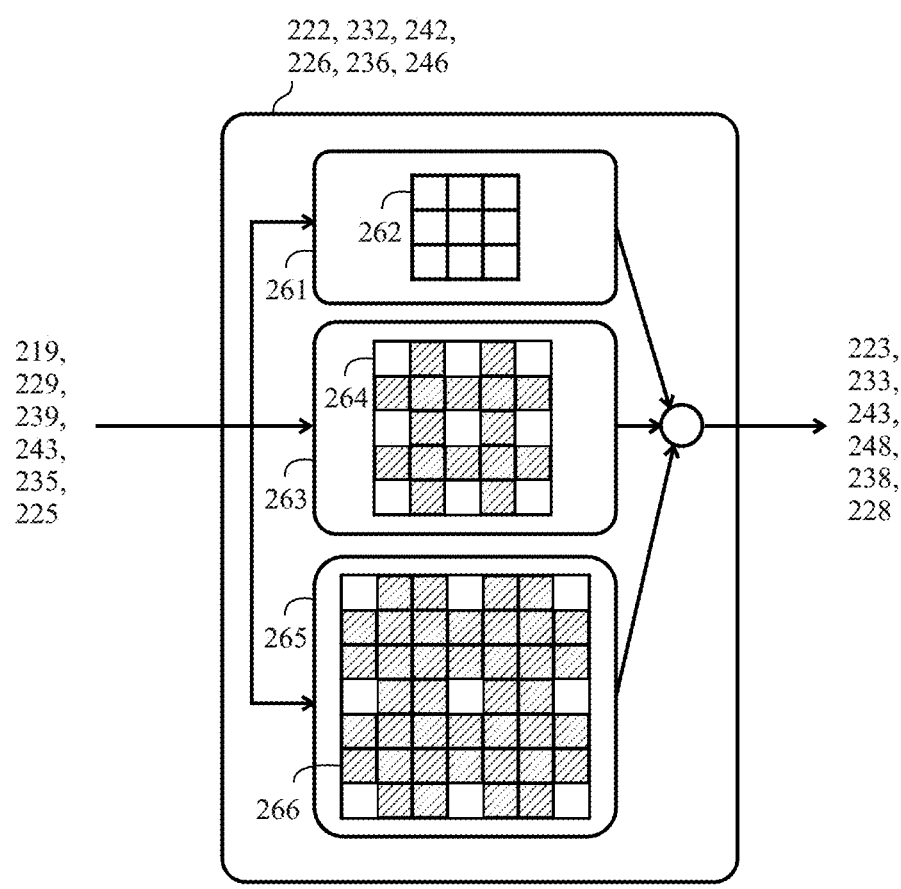
FIG. 7 is a further detailed schematic illustration of an encoder or decoder block depicted in FIG. 6 comprising an atrous convolution inception block in accordance with a preferred embodiment of the invention.

As illustrated in FIG. 7, all encoder blocks 222, 232, 242 and decoder blocks 226, 236, 246 of the various processing stages 220, 230, 240 comprise a so-called atrous inception convolution block instead of being limited to a typical matrix convolution, as would be known from traditional convolutional neural network models.

An explanation is now given by means of input 219, which is the original thermal footprint image 40 that is processed by the encoder block 222 of the first processing stage 220 of the convolutional network model 200. The same reasoning applies to the remaining encoder and decoder blocks and their respective inputs/outputs.

During the design of any convolutional neural network model, the selection of an appropriate kernel or filter size for a specific convolutional layer is an important parameter. It is difficult to know a priori the optimum size of the kernel. The goal is to design a kernel that covers the entire relevant region of the input tensor, i.e., the input image. This is particularly important because kernels (filters that are convoluted with the input image) produce features that the convolutional neural network model learns. A small kernel may not be able to extract salient features, and on the contrary, not all the values in a kernel contribute equally to the output. Thus, a larger kernel is not always a guarantee of a better performance.

A large kernel is preferred when the information is distributed more globally, and a smaller kernel is preferred for information that is distributed more locally. In general, one reason to prefer a small kernel is that it reduces computational costs.

As illustrated, the input 219 to a processing stage (encoder/decoder) is processed by three filters 261, 263, 265, each having a different kernel size 262, 264, 266. A different plurality of filters may be used without departing from the scope of the invention. The respective filtered outputs are averaged and the result 223 is sent to another similarly structured encoder or decoder block. This inception convolution structure averages the responses of three kernels to minimize errors caused by individual outputs.

Wider receptive fields, as for example the receptive field of the larger kernel 266 as compared to the smaller kernel 262, need more computational resources when a convolution operation is made.

Dilated convolution or Atrous convolution is therefore used to scale the baseline kernel 262. Atrous convolution introduces a new parameter called dilation rate, r, which is the space between the kernel's coefficients. The kernels 264 and 266 are therefore dilated versions of the baseline kernel 262. In the illustration of FIG. 7 the nine kernel values shown as white squares in the initial baseline kernel 262 are found in each of the dilated kernels 263 and 266, but in these dilated kernels, intermediate zero values shown as grey squares are used as padding.

The construction of a dilated kernel provides a wider receptive field at the same computational cost. The definition of atrous convolution is given by:

$$(x * w)[i] = \sum_{k} \{x[i + rk]w[k]\}$$

where i is the location of the input, k is the size of the kernel support, and r is the dilation rate or stride. Note that when r=1, it is the definition of standard convolution.

The filtered intermediate outputs of three different dilated kernels 262, 264, 266 are averaged to obtain an output that is sent to the next encoder or decode block. In this way, it is possible to combine large receptive fields with the same hardware.

A very small filter may not capture groove's characteristics, but, on the other hand, very large filters require high computational resources and excessive training. The solution provided by the invention provides an interesting balance between these two approaches. By way of a non-limiting example the initial kernel size of the baseline kernel 262 is 7×7 and three different dilation rates are used r={1, 2, 4}.

The output 228 of the first processing stage 220 if fed into a multi-class activation function 250, that produces the segmentation mask 50.

An activation function is a transfer function that maps the output of a node (that performs a convolution operation) into a certain value range that is suitable for the next node or layer based on weights and a bias. Activation functions are well known in the art and will not be explained to further detail in the context of this invention. They allow the introduction of non-linearity into the model. We used the following three activation functions in our model: the well-known ReLU activation is typically included after every convolutional layer of a neural network model. It prevents all neurons (nodes that perform convolution operations) from being active at the same time, as negative inputs to the ReLU function are set to zero.

The last activation layer 250 at the end of the model plays an important role because it converts the raw output values into class probabilities. The Softmax activation function is used. It is a generalized form of the sigmoid function that normalizes the outputs for each class between 0 and 1, and divides them by their sum as:

$$f(z) = \exp(z) / \sum \exp(x).$$

This is often described as a combination of multiple sigmoids that returns the probability for a pixel belonging to each individual class among a plurality of multiple classes.

Preferably, each input thermal footprint image from a sequence of such acquired thermal footprint images is processed sequentially by the described method.

Figure 8:
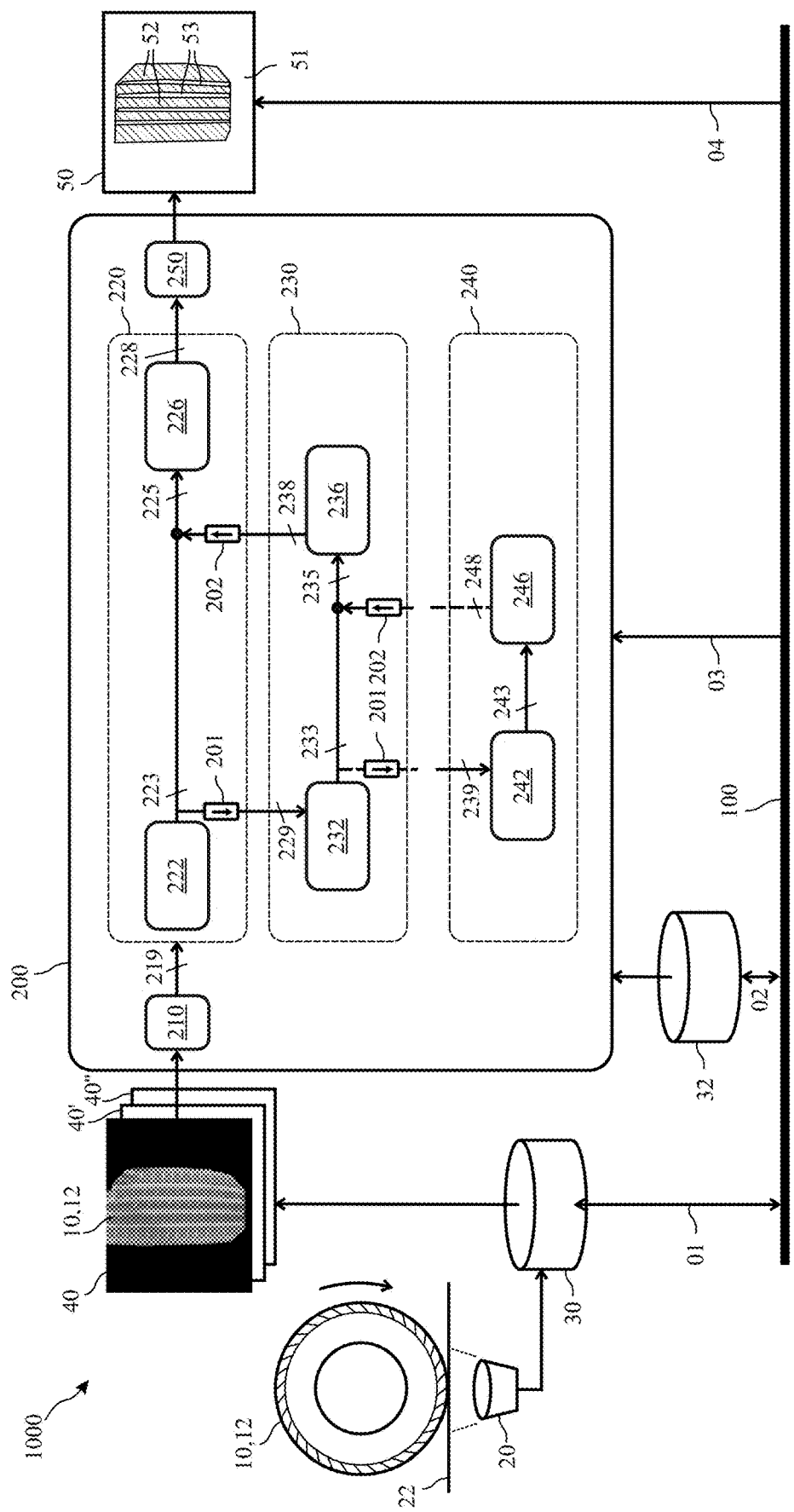
FIG. 8 is a schematic illustration of a preferred embodiment of a system in accordance with the invention, in which a sequence of thermal footprint images is segmented.
Figure 9:
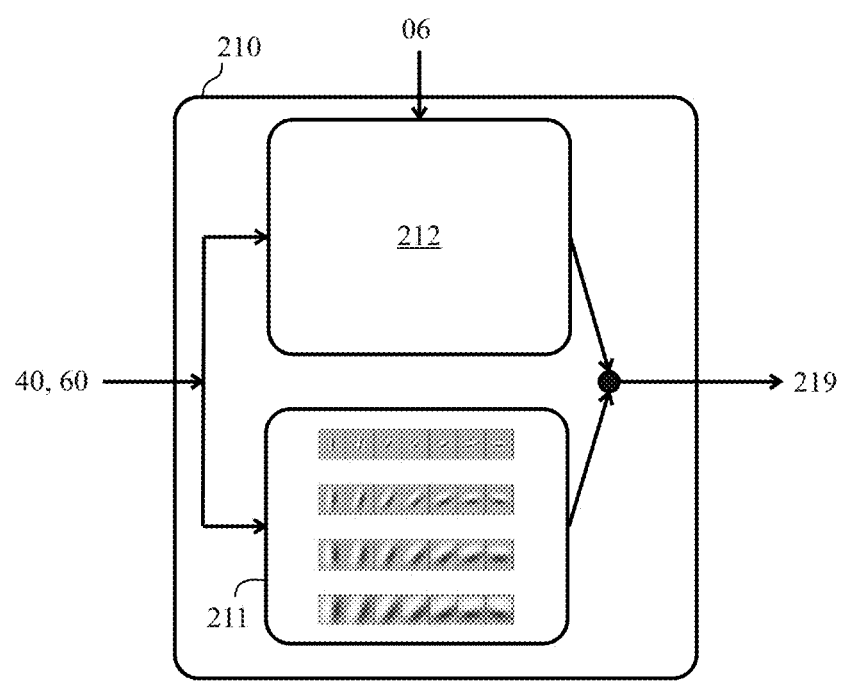
FIG. 9 is a schematic illustration of a prefiltering block depicted in FIG. 8 comprising a Gabor filter bank and a trainable filter bank in accordance with a preferred embodiment of the invention.

Figures FIG. 8 and FIG. 9 show a best mode embodiment 1000 of the invention. It will be appreciated that steps 01, 02, 03 and 04 are the same as in the embodiment that has been described with reference to FIG. 6, with the exception of the addition of a pre-filtering block 210, which filters an input image 40, 40', 40" into the input 219, which is then processed using the various processing stages 220, 230, 240 of the convolutional neural network model 200, as previously described. The input images 40, 40', 40" are frames from a captured video sequence, and each of the input images if processed independently of the others by the convolutional network model 200.

The pre-filtering block 210 implements an edge enhancing digital image filter, which emphasizes the features that should be identified by the convolutional neural network model 200, i.e., ribs, grooves, blocks of the tire's tread pattern. While any edge enhancing digital image filter may be used without departing from the scope of the present invention, it is particularly advantageous to use bank of Gabor filters. Gabor filters are steerable filters, which are defined as the product of a complex sinusoid and a Gaussian function. The role of the Gaussian function is to act as a modulator or signal envelope. Its canonical form is given by:

$$g(x, y) = Ke^{-\frac{1}{2}\left[\frac{(x-x_0)^2 + \gamma(y-y_0)^2}{\alpha^2}\right]} + i(2\pi[u_o(x-x_o) + v_o(y-y_o)] + \phi)$$

$$= Ke^{-\frac{1}{2}\left(\frac{x^2 + \gamma^2 y^2}{\alpha^2}\right)}[\cos(2\pi u_o x) + \sin(2\pi u_o x)]$$

where K is a normalizing constant, (x0, y0) is the center of the filter, (u0, v0) and φ represent the radial frequency and the phase of the sinusoidal signal, respectively. (α,γ) control the filter bandwidth. In a preferred embodiment, only the real part of the Gabor function which represents an even-symmetric filter is considered:

$$g_e = Ke^{-\frac{1}{2}\left(\frac{x^2 + \gamma^2 y^2}{\alpha^2}\right)} \cos(2\pi u_o x)$$

The frequency and orientation selectivity properties of the Gabor filters are explicit in the Fourier domain. By using different parameters, it is possible to build a filter bank with different Gabor filters. In this preferred embodiment, a Gabor filter bank with seven orientations and four scales is used. The varying orientations of the filters allow to enhance edges extending in all directions, which is of particular interest in the cornering tire case, where the ribs, grooves and blocks of the tire's tread pattern are skewed. However, other combinations may be used without departing from the scope of the present invention. Advantageously the DC component is removed and the odd bands are rotated in order to better cover the Fourier plane.

A most preferred embodiment of the pre-filtering block 210 is illustrated in FIG. 9. The input thermal footprint image 40 is filtered by the Gabor filter bank 211 that has been described, and the filters of which are shown. In parallel, the input thermal footprint image 40 is also filtered by a filter bank 212 with trainable filters to give the network more flexibility. Thus, the input 40 is filtered with both filter banks 211 and 212 and the respective outputs are concatenated 219 before passing to the first processing stage 220 of the convolutional neural network model 200.

Figure 10:
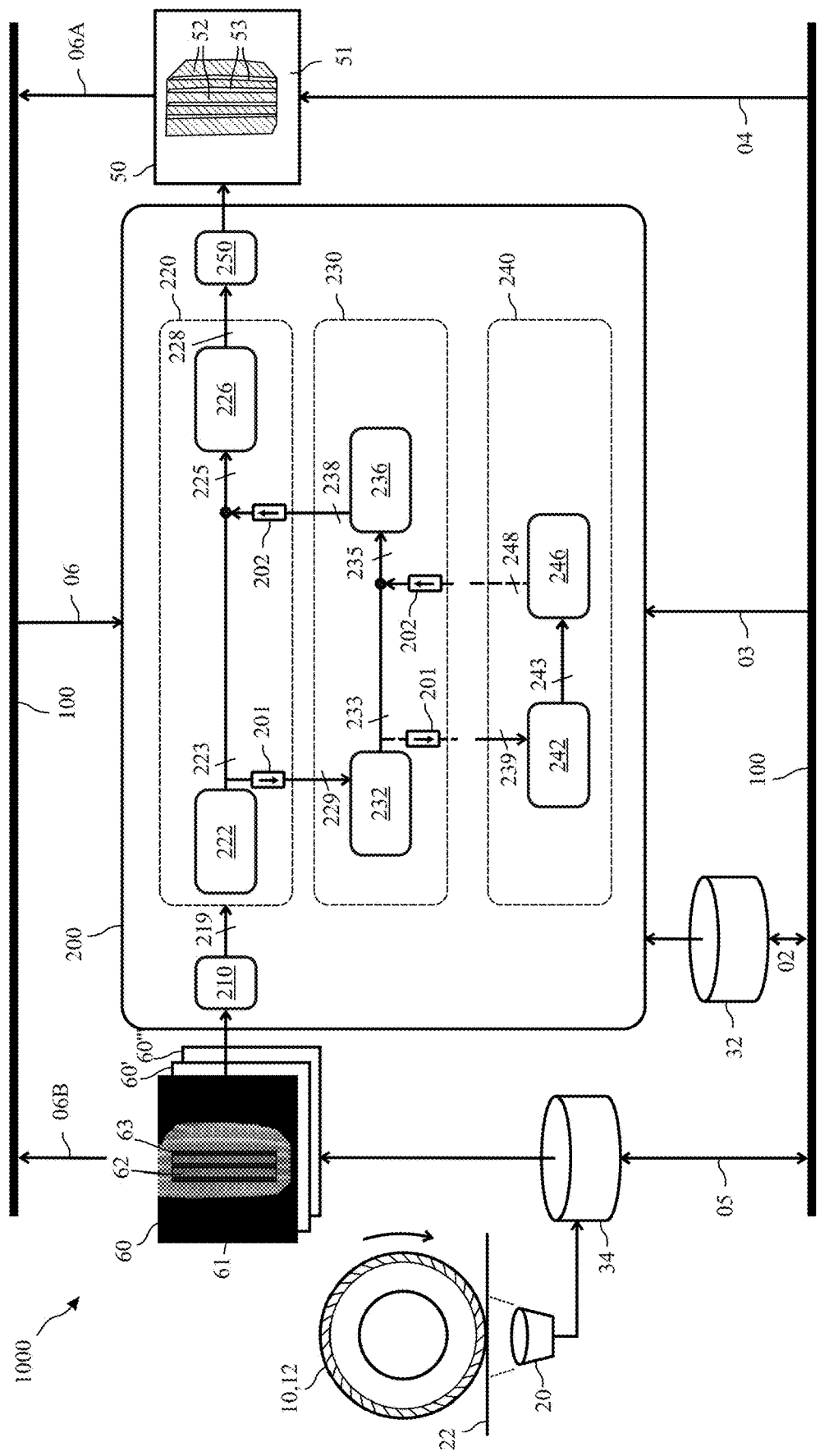
FIG. 10 is a schematic illustration of a preferred embodiment of a system in accordance with the invention, in which a training step of the convolutional neural network model is also depicted.

FIG. 10 depicts the same system 1000 as FIG. 9, but it further illustrates the training phase of the convolutional network model 200. During the preliminary training phase, the execution of the convolutional network model 200 is exactly the same as during the previously described execution of the already trained convolutional network model 200. However, a set comprising a plurality of thermal footprint training images 60, 60', 60" stored in a training image memory element 34 is used 05 as input by the processor 100. Each thermal footprint training image 60, 60', 60" is labelled with the known locations of the components 61, 62, 63 of the tire's tread pattern and background that the convolutional network model 200 is supposed to identify after training. The generated segmentation mask 50 with identified features 51, 52 and 53 is compared to the ground truth as given by the corresponding labeled training image 60. Then, during a training step 06, the computer processor 100 adapts the trainable parameters of the convolutional neural network model 200 so that, when the same training image is processed once more, the difference or error between the generated segmentation mask and the ground truth is minimized. This process is repeated for each thermal footprint training image. The trainable parameters of the convolutional neural network model 200 comprise for example the weights of activation layers, but preferably also the parameters of the trainable filter bank 212, which is part of the pre-filtering block 210, as shown in FIG. 9.

In experiments, a training image set of 2235 was used, 200 validation images and 2300 images for testing was used, which comprises pre-segmented thermal footprint images in straight and cornering conditions as shown in FIG. 1A and FIG. 1B respectively.

The background of each acquired thermal footprint training image was removed. A method for removing the background in a thermal IR footprint video has for example been proposed in R. Nava et al. "Tire Surface Segmentation in Infrared Imaging with Convolutional Neural Networks", ICPR, International Workshops and Challenges Pattern Recognition, 2021, pp. 51-61, which is hereby incorporated by reference in its entirety.

Preferably, the thermal footprint training images depict tires of the same make and type as the input thermal footprint images which the system 1000 processes after training. However, if several sets of training images from different types of tires are used, this restriction may not be necessary.

In experiments, a classification accuracy of 0.98 for straight rolling and cornering tires was obtained with the system 1000 depicted in FIG. 9, which confirms the proposed methodology in accordance with the present invention.

Once the segmentation masks 50 are computed for a given input thermal footprint image 40, it is possible to use them as template or guide to collect the temperature of the rolling tire. A template mask typically defines ten regions: five ribs, four grooves, and background, and the mean temperature for each region may for example be extracted separately for further use.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

The invention claimed is:

1. A computer-implemented method for identifying components of a tire's tread pattern in an input thermal footprint image of a tire acquired from underneath a surface that is transparent to infrared radiation, while the tire is rolling thereon, the method comprising the steps of providing a convolutional neural network model in a memory element, which is trained to identify the components of a tire's tread pattern in an input thermal footprint image of a tire;

executing the convolutional neural network model to identify components of a tire's tread pattern in the input thermal footprint image of a tire, thereby generating a segmentation mask of the input thermal footprint image;

wherein executing the convolutional neural network model comprises the steps of:

associating a resolution value with each of a plurality of consecutive processing stages forming the convolutional neural network model, each processing stage comprising an encoder block and an associated decoder block;

processing, at an encoder block of at least one processing stage, an encoder input having the resolution value associated with the processing stage, into an output having the same resolution value, which is forwarded to an associated decoder block, and which is down-sampled to a lower resolution value for processing by a processing stage associated with the lower resolution value;

processing, at a decoder block of said at least one processing stage, a decoder input comprising a concatenation of the output forwarded by an associated encoder block and of an up-sampled output generated by a processing stage associated with a lower resolution value, into a processing stage output having the resolution value associated with the decoder block's processing stage;

and wherein processing at the encoder block and at the decoder block comprises processing the respective input into a plurality of filtered intermediate outputs by using an atrous convolution step, wherein a filtering kernel is used at a corresponding plurality of different kernel dilution rates, and computing the respective output by generating an average of the filtered intermediate outputs.

2. The computer-implemented method according to claim 1, wherein the step of providing a convolutional neural network model comprises the preliminary steps of:

providing a plurality of thermal footprint training images of at least one tire, in which known components of the respective tire's tread pattern are identified;

executing the convolutional neural network model using each of the thermal footprint training images as an input thermal footprint image, to identify components of a tire's tread pattern in the thermal footprint training images, thereby generating a segmentation mask of the corresponding thermal footprint training images, and iteratively updating trainable parameters of the convolutional neural network model so as to minimize an error between the components of a tire's tread pattern that are identified by the convolutional neural network model, and the known components of the tire's tread pattern, which are identified in the corresponding thermal footprint training image of the tire;

thereby training the convolutional neural network model.

3. The computer-implemented method according to claim 1, wherein the input thermal footprint image of a tire is pre-processed using an edge enhancing digital image filter prior to executing the convolutional neural network model to identify components of a tire's tread pattern in the pre-processed input thermal footprint image.

4. The computer-implemented method according to claim 1, wherein the input thermal footprint image of a tire is pre-processed using a filter bank comprising a plurality of Gabor filters, wherein each Gabor filter is characterized by a different combination of orientation and scale.

5. The computer-implemented method according to claim 1, wherein the step of executing the convolutional neural network model comprises pre-filtering the encoder input of the first processing stage at a pre-filtering stage that includes an edge enhancing digital image filter and a digital image filter having trainable parameters for pre-filtering the input thermal footprint image of a tire, and wherein the trainable parameters of the digital image filter are determined during a training step.

6. The computer-implemented method according to claim 5, wherein the edge enhancing digital image filter comprises a filter bank of Gabor filters, wherein each Gabor filter is characterized by a different combination of orientation and scale, and wherein the digital image filter having trainable parameters comprises a filter bank of digital image filters having trainable parameters.

7. The computer-implemented method according to claim 1, wherein processing the respective input at the encoder block and at the decoder block of a processing stage of the convolutional neural network model into a plurality of filtered intermediate outputs by using an atrous convolution step comprises processing the respective input into three filtered intermediate outputs using an atrous convolution step, wherein a same filtering kernel of size 7 times 7 pixels is used at the three kernel dilution rates of 1, 2 and 4.

8. The computer-implemented method according to claim 1, wherein the convolutional neural network model comprises three processing stages.

9. The computer-implemented method according to claim 1, wherein the generated segmentation mask is a multi-class segmentation mask comprising at least three different classes.

10. The computer-implemented method according to claim 1, wherein the step of executing the convolutional neural network model comprises processing the output of the decoder block of the first processing stage, using a final activation function of the SoftMax type, for classifying the output of the decoder block of the first processing stage into a plurality of at least three different classes, thereby identifying a corresponding plurality of component types of a tire's tread pattern.

11. The computer-implemented method according to claim 1, wherein the trained convolutional neural network model is capable of identifying at least background, ribs and groves of a tire's tread pattern in an input thermal footprint image of the corresponding tire.

12. The computer-implemented method according to claim 1, wherein the input thermal footprint image of a tire is acquired using an infrared imaging device.

13. The computer-implemented method according to claim 1, wherein the input thermal footprint image of a tire is pre-segmented into two classes, wherein a first class comprises the tire's footprint, and wherein a second class comprises background content.

14. The computer-implemented method according to claim 1, further comprising a step of extracting temperature information of a component of a tire's tread pattern from an input thermal footprint image of the tire, based on the generated segmentation mask, which identifies the location of said component in the input thermal footprint image of the tire.

15. A computer-implemented method for identifying components of a tire's tread pattern in an input thermal footprint video of a tire comprising a sequence of input thermal footprint images of a tire acquired from underneath a surface that is transparent to infrared radiation while the tire is rolling thereon, the method comprising the steps of providing a convolutional neural network model in a memory element, which is trained to identify the components of a tire's tread pattern in an input thermal footprint image of a tire;

executing the convolutional neural network model to identify components of a tire's tread pattern in each input thermal footprint image of the input thermal footprint video of a tire, thereby generating a segmentation mask for each input thermal footprint image;

wherein executing the convolutional neural network model comprises the steps of:

associating a resolution value with each of a plurality of consecutive processing stages forming the convolutional neural network model, each processing stage comprising an encoder block and an associated decoder block;

processing, at an encoder block of at least one processing stage, an encoder input having the resolution value associated with the processing stage, into an output having the same resolution value, which is forwarded to an associated decoder block, and which is down-sampled to a lower resolution value for processing by a processing stage associated with the lower resolution value;

processing, at a decoder block of said at least one processing stage, a decoder input comprising a concatenation of the output forwarded by an associated encoder block and of an up-sampled output generated by a processing stage associated with a lower resolution value, into a processing stage output having the resolution value associated with the decoder block's processing stage;

and wherein processing at the encoder block and at the decoder block comprises processing the respective input into a plurality of filtered intermediate outputs by using an atrous convolution step, wherein a filtering kernel is used at a corresponding plurality of different kernel dilution rates, and computing the respective output by generating an average of the filtered intermediate outputs.

16. The computer-implemented method according to claim 15, wherein each input thermal footprint image of a tire is pre-processed using a filter bank of Gabor filters and using a filter bank of digital image filters having trainable parameters, wherein each Gabor filter is characterized by a different combination of orientation and scale.

17. The computer-implemented method according to claim 15, wherein processing the respective input at the encoder block and at the decoder block of a processing stage of the convolutional neural network model into a plurality of filtered intermediate outputs by using an atrous convolution step comprises processing the respective input into three filtered intermediate outputs using an atrous convolution step, wherein a same filtering kernel of size 7 times 7 pixels is used at the three kernel dilution rates of 1, 2 and 4.

18. A system for identifying components of a tire's tread pattern in an input thermal footprint image of a tire acquired from underneath surface that is transparent to infrared radiation, while the tire is rolling thereon, the system comprising a memory element holding a convolutional neural network model, which is trained to identify the components of a tire's tread pattern in an input thermal footprint image of a tire;

a data processor configured to execute the convolutional neural network model to identify components of a tire's tread pattern in the input thermal footprint image of a tire, thereby generating a segmentation mask of the input thermal footprint image;

wherein executing the convolutional neural network model comprises the steps of:

associating a resolution value with each of a plurality of consecutive processing stages forming the convolutional neural network model, each processing stage comprising an encoder block and an associated decoder block;

processing, at an encoder block of at least one processing stage, an encoder input having the resolution value associated with the processing stage, into an output having the same resolution value, which is forwarded to an associated decoder block, and which is down-sampled to a lower resolution value for processing by a processing stage associated with the lower resolution value;

processing, at a decoder block of said at least one processing stage, a decoder input comprising a concatenation of the output forwarded by an associated encoder block and of an up-sampled output generated by a processing stage associated with a lower resolution value, into a processing stage output having the resolution value associated with the decoder block's processing stage;

and wherein processing at the encoder block and at the decoder block comprises processing the respective input into a plurality of filtered intermediate outputs by using an atrous convolution step, wherein a filtering kernel is used at a corresponding plurality of different kernel dilution rates, and computing the respective output by generating an average of the filtered intermediate outputs.

19. The system according to claim 18, wherein the data processor is further configured to pre-process each input thermal footprint image of a tire using a filter bank of Gabor filters and using a filter bank of digital image filters having trainable parameters, wherein each Gabor filter is characterized by a different combination of orientation and scale.

20. The system according to claim 18, wherein processing the respective input at the encoder block and at the decoder block of a processing stage of the convolutional neural network model into a plurality of filtered intermediate outputs by using an atrous convolution step comprises processing the respective input into three filtered intermediate outputs using an atrous convolution step, wherein a same filtering kernel of size 7 times 7 pixels is used at the three kernel dilution rates of 1, 2 and 4.

* * * * *